(12) United States Patent
Revol

(10) Patent No.: US 8,907,844 B2
(45) Date of Patent: Dec. 9, 2014

(54) DUAL FREQUENCY RECEIVER FOR SATELLITE BASED POSITIONING AND ASSOCIATED METHOD OF RECEPTION

(75) Inventor: Marc Revol, UPIC (FR)

(73) Assignee: Thales, Neuilly-sur-Seine (FR)

( * ) Notice: Subject to any disclaimer, the term of this patent is extended or adjusted under 35 U.S.C. 154(b) by 413 days.

(21) Appl. No.: 13/439,474

(22) Filed: Apr. 4, 2012

(65) Prior Publication Data

US 2013/0093620 A1 Apr. 18, 2013

(30) Foreign Application Priority Data

Apr. 14, 2011 (FR) ..................................... 11 01166

(51) Int. Cl.
| | |
|---|---|
| *G01S 19/32* | (2010.01) |
| *G01S 19/29* | (2010.01) |
| *G01S 19/30* | (2010.01) |
| *G01S 19/20* | (2010.01) |
| *G01S 19/22* | (2010.01) |
| *G01S 19/24* | (2010.01) |
| *G01S 19/37* | (2010.01) |

(52) U.S. Cl.
CPC ................. *G01S 19/20* (2013.01); *G01S 19/22* (2013.01); *G01S 19/24* (2013.01); *G01S 19/32* (2013.01); *G01S 19/37* (2013.01)
USPC ............. 342/357.72; 342/357.68; 342/357.69

(58) Field of Classification Search
CPC ......... G01S 19/29; G01S 19/30; G01S 19/32; H04B 7/1855
USPC ............. 342/357.59, 357.68, 357.69, 357.72, 342/357.78; 701/473, 503
See application file for complete search history.

(56) References Cited

U.S. PATENT DOCUMENTS

| | | | |
|---|---|---|---|
| 4,463,357 A | | 7/1984 | MacDoran |
| 5,535,278 A | * | 7/1996 | Cahn et al. ..................... 380/274 |
| 5,537,121 A | * | 7/1996 | Lennen ..................... 342/357.61 |
| 5,903,654 A | | 5/1999 | Milton et al. |

OTHER PUBLICATIONS

Institute National de la Propriete Industrielle, Rapport de Recherche Preliminaire, Dec. 22, 2011, France.
Kent Krumvieda et al., "A Complete IF Software GPS Receiver: A Tutorial about the Details," Proceedings of the Institute of Navigation, Sep. 11-14, 2001, Salt Lake City, Utah.

* cited by examiner

*Primary Examiner* — Dao Phan
(74) *Attorney, Agent, or Firm* — Michael J. Donohue; Davis Wright Tremaine LLP

(57) ABSTRACT

Dual-frequency receiver for satellite-based positioning, comprising a main measurement channel and a secondary channel for a calculation for correction of ionospheric propagation robust to differential errors linked to the local reception environment of the signals. Each channel comprises a code generator, a carrier phase generator, integrators, phase and code discriminators, a code phase numerically-controlled oscillator, a carrier phase numerically-controlled oscillator, carrier phase loop matched filtering means, and code phase loop matched filtering means. The receiver further including:
   means for determining the respective phase errors in the main and secondary channels comprising means of interspectral correlation of the signals of the main and secondary channels already correlated by the local code, after frequency compensation of the relative Doppler shifts of the signals; and
   respective feedback loops for the code and carrier phase errors in the main and secondary channels.

6 Claims, 2 Drawing Sheets

DUAL FREQUENCY RECEIVER FOR SATELLITE BASED POSITIONING AND ASSOCIATED METHOD OF RECEPTION

BACKGROUND OF THE INVENTION

1. Field of the Invention

The present invention pertains to the improvement of robustness in relation to multipaths of a dual-frequency receiver for satellite-based positioning.

2. Description of the Related Art

The measurements of pseudo-distances and of signal phases of a global navigation satellite system, or GNSS for "Global Navigation Satellite System" in English, for location and attitude measurement purposes, may be marred by large errors, if the propagation environment modifies the assumption of direct rectilinear trajectory between the satellites and the receiver.

This may, for example, be the case upon multiple reflections of the signals (multipaths) or upon maskings or obscurations (blade modulation in the case of installation on a helicopter).

Modern receivers generally integrate specific processing procedures, also called discriminators, for a correlation function so as to decrease the impact of the effects of the multipaths on the measurement of time received (by improving the code discriminator of the code tracking loops or DLL for "Delay Lock Loop" in English), but these processing procedures have a restricted domain of effectiveness (for example according to the delay of the paths) and entail only a small improvement in the carrier phase errors. Moreover, the extensions of the GPS system and the new GNSS systems base the monitoring of the integrity of the signals essentially on the coherence of the measurements of pseudo-distances and not on the measurements of the carrier phases.

Now, the phase of GNSS signals is increasingly becoming used for high-precision location (RTK for "Real Time Kinematic" in English) and attitude measurement applications with multiple antennas.

Known advanced schemes for reducing multipath errors in pseudo-distances, make use of the shape of the correlation function, such as the Double-Delta, MEDLL, or narrow-correlator schemes.

However, these schemes remain linked to propagation models (specular reflection, triangular correlation function, etc).

BRIEF SUMMARY OF THE INVENTION

An aim of the invention is to improve at one and the same time the measurements of pseudo-distances and of phases, as well as to help to increase the coherence of the measurements of code and carrier phases thus obtained.

There is proposed, according to one aspect of the invention, a dual-frequency receiver for satellite-based positioning, comprising a main measurement channel and a secondary channel for a calculation for correction of ionospheric propagation robust to differential phase errors linked to the local reception environment of the signals. Each channel comprises a code phase generator, a carrier phase generator, integrators, phase and code discriminators, a code phase numerically-controlled oscillator, a carrier phase numerically-controlled oscillator, carrier phase loop matched filtering means, and code phase loop matched filtering means. The receiver comprises, furthermore:

means for determining the respective code and carrier phase errors in the said main and secondary channels comprising means of interspectral correlation of the signals of the main and secondary channels already correlated by the local code, after frequency compensation of the relative Doppler shifts of the said signals; and respective feedback loops for the said code and carrier phase errors in the said main and secondary channels.

Such a receiver makes it possible to eliminate errors linked to the existence of multipaths on the two frequency channels, thus providing an improvement at one and the same time of the measurements of pseudo-distance and of phase, and helps to increase the integrity of the measurements of carrier and code phases thus obtained.

This interspectral product of the frequency channels makes it possible to identify within each the signals obtained in baseband (resulting from the correlation by the local codes), the correlated errors, linked to the modes of propagation (multipaths), that are common to the two reception frequencies. In particular, it makes it possible to identify errors which are not necessarily linked to simple specular reflections, which are manifested by a complex composition of the amplitude and phase terms of the various signals received. This complex error term, also called the transfer function of the propagation channel, is then used to recompose a local code matched to the propagation channel, coherent with this complex propagation error.

The present receiver discloses new "open", i.e. unencrypted, multi-frequency signals such as L1C, L2C, L5 for GPS or Galileo (L1BC, E6BC, E5$a$ and E5$b$), which make it possible to carry out the intercorrelation between frequency channels on the demodulated signals, obtained after matched filtering, doing so without loss of signal-to-noise ratio (zero need for prior processing of the P code).

The main aim of this intercorrelation or interspectral correlation is the identification of the characteristics of the specular multipaths and the correction of the errors which stem therefrom in the code discriminator, under the assumption that they are common to the two frequency channels. The processing assumption presumes that the propagation multipaths are identical on the two frequencies, and that they are identifiable after matched filtering in the form of a summation of attenuated paths, delayed and affected by different Dopplers.

In an embodiment adapted to the case of fixed or slowly moving receivers exhibiting slowly variable multipath errors, the observation of the response of the channel is carried out each second in the medium term (over a sliding horizon of about 10 to 20 seconds) in a 50 Hz band on each frequency channel by spectral analysis (by FFT of from 512 to 1024 points) of the signal obtained on output from matched filtering after coherent integration of a duration of 20 ms. In another embodiment adapted to the case of mobile receivers exhibiting rapidly variable (typically from 1 Hz to 1000 Hz) multipath errors, the observation of the response of the channel is carried out each second in the short term (over a horizon of about 1 second) on each frequency channel by spectral analysis (by FFT of 1024) of the signal obtained on output from matched filtering after short coherent integration of a duration of 1 ms.

The correction of the propagation channel consists in carrying out, prior to the correlation with the signal received, the temporal multiplication of the local code with the complex conjugate response of the propagation channel.

The implementation of this correction of the channel is carried out in the domain as follows:

spectral analysis (by Fourier transformation or FFT) with sliding window by intervals of 1 second, carried out on the demodulated signals obtained after matched filtering and pre-integration, for each of the two frequency pathways, identification by interspectral product (of the outputs of the Fourier transformations) of the propagation characteristics (spectrum of the propagation channel) common to the two frequency channels, inverse Fourier transformation of this product by $DFT^{-1}$ for estimation in the temporal domain of the complex response of the propagation channel, at the rate of a second, multiplication at the rate of the calculation of the $DFT^{-1}$, between the complex conjugate temporal response of the propagation channel and the local code, multiplication of the signal received by the conjugate local code (P and E-L) thus obtained.

Thus, the improvement of the estimation of the ionospheric propagation delay is a consequence derived from the claim of the correction of the errors of the propagation channel; the ionospheric propagation delay is estimated in the short term (of the order of each second) on the basis of the instantaneous measurements of pseudo-distance carried out on the two frequencies, after correction of the propagation channel (of the order of a few tens of seconds).

In an embodiment, the said determination means comprise means of Doppler-effect compensation of the said signals.

Thus, the error phase of the complex propagation signals, obtained after demodulation by the local code on each of the frequency channels dependent on the frequency of the reception carrier, may be compensated as a function of the frequency discrepancy between the two pathways so as to manifest solely the delay errors, presumed to be identical for the propagation multipaths received on the two frequency pathways.

According to one embodiment, the said determination means comprise means for compensating for the output signal of the said dedicated means of intercorrelation by the respective carrier phase errors of the said signals, specific to the local reception environment on the one hand and to the propagation of the signal on the other hand, so as to transmit the resulting signals in the said loops.

Thus, the compensation of the output error signal of the carrier phase tracking loops by the estimations of the carrier phase errors ($\phi 1$ and $\phi 2$), obtained after correlation by each of the local codes averaged in the pre-detection band on the frequencies L1 and L2, makes it possible to compensate, after multiplication of the resulting error signal, representing the estimate of the transfer function of the propagation channel, with the locally generated code, for the spurious errors introduced by the signal propagation channel (multipaths). The signals thus obtained represent the phase errors, observed for example in a band of 50 Hz (corresponding to the coherent integration of 20 ms), linked solely to the propagation disturbances.

According to another aspect of the invention, there is also proposed a method of dual-frequency reception for satellite-based positioning, by a main measurement channel and a secondary channel for calculating a correction of the ionospheric propagation, in which:

respective code and carrier phase errors in the said main and secondary channels are determined by interspectral correlation of the signals of the main and secondary channels already correlated by the local code, after frequency compensation of the relative Doppler shifts of the said signals; and respective feedback loops for the said code and carrier phase errors in the said main and secondary channels are effected.

BRIEF DESCRIPTION OF THE SEVERAL VIEWS OF THE DRAWINGS

The invention will be better understood on studying a few embodiments described by way of wholly non-limiting examples and illustrated by the appended drawings in which.

DETAILED DESCRIPTION OF THE INVENTION

Figure 1:
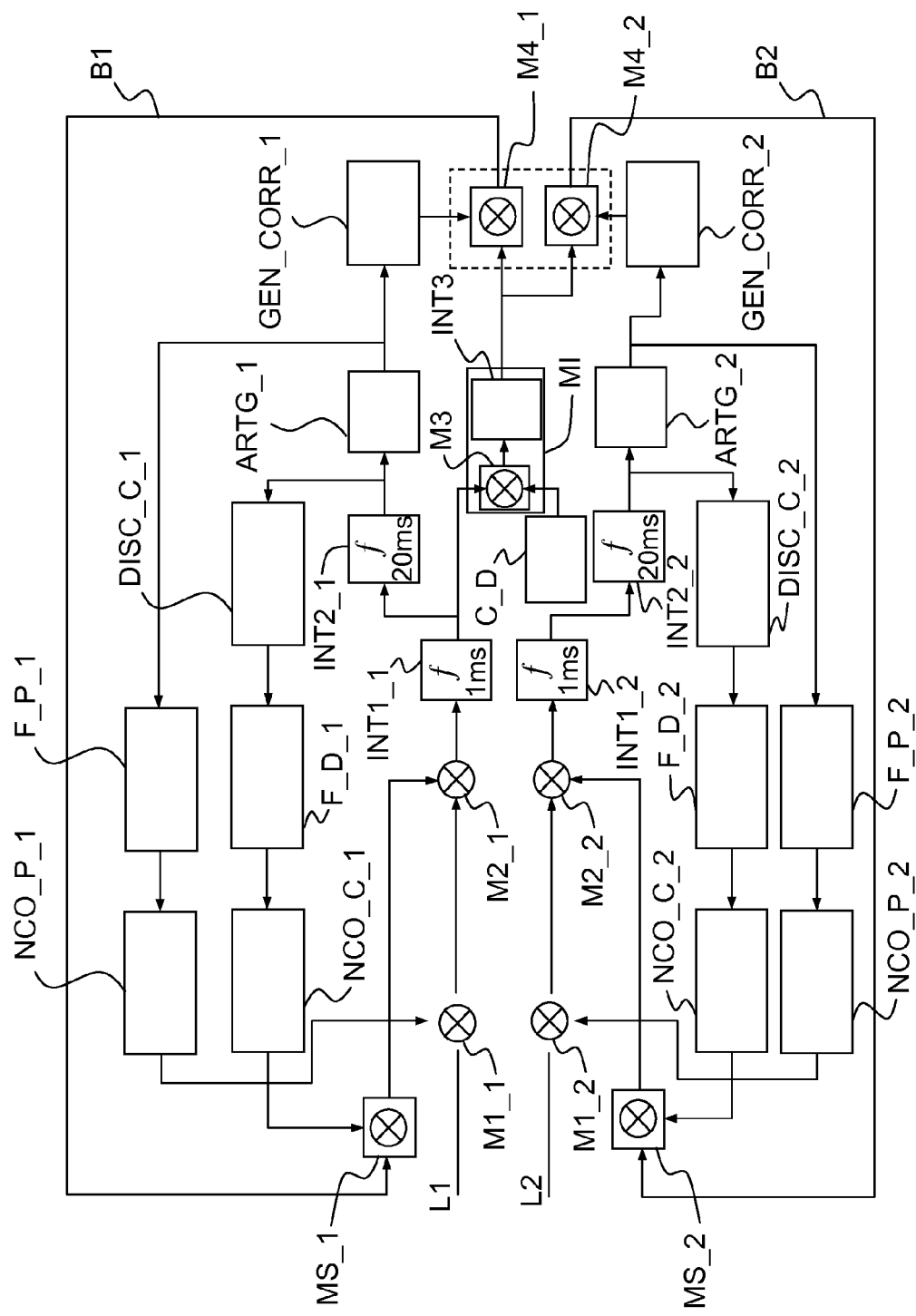
FIG. 1 schematically illustrates a receiver according to one aspect of the invention.

FIG. 1 is schematically illustrated the processing of a tracking pathway limited to a satellite of a dual-frequency L1, L2 receiver for satellite-based positioning.

The receiver comprises a main measurement channel L1 and a secondary channel L2 for a calculation for correction of ionospheric propagation.

The main L1 and secondary L2 channels comprise respectively first multipliers M1_1 and M1_2 for multiplying the respective signals at the input of the main L1 and secondary L2 channels, by the signals of the respective carrier phase tracking loops or PLL for "Phase Lock Loop" in English.

The main L1 and secondary L2 channels comprise respectively second multipliers M2_1 and M2_2 for multiplying the respective output signals of the first multipliers M1_1 and M1_2, by the signals of the respective code tracking loops or DLL for "Delay Lock Loop" in English.

First integrators INT1_1, INT1_2, are respectively disposed at the output of the second multipliers M2_1 and M2_2 for carrying out the correlation with the signal received over the length of the local code, over a duration of the order of 1 ms.

Second integrators INT2_1, INT2_2, integrating over a duration of the order of 20 ms, are respectively disposed at the output of the first integrators INT1_1, INT1_2.

The output signals of the second integrators INT2_1, INT2_2, are respectively transmitted in the code tracking loops, which each comprise respectively a code discriminator DISC_C_1, DISC_C_2, followed by a filter F_D_1, F_D_2, followed by a numerically-controlled oscillator NCO_C_1, NCO_C_2, whose output is transmitted to the second multiplier M2_1, M2_2.

The output signals of the second integrators INT2_1 and INT2_2 are also respectively transmitted in the phase tracking loops, which each comprise respectively an arctangent discriminator ARTG_1, ARTG_2, delivering as output an estimation of the carrier phase error $\phi_1$, $\phi_2$, followed by a filter F_P_1, F_P_2, followed by a numerically-controlled oscillator NCO_P_1, NCO_P_2, whose output is transmitted to the first multiplier M1_1, M1_2.

The output signal of the first integrator INT1_2 of the secondary channel L2 is also transmitted to a module for compensation C_D of the relative frequencies of the main L1 and secondary L2 channels for adjusting the Doppler shift of the error signals at the output of the first integrator INT1_2 of the secondary channel L2.

Its aim is to refer the phase errors obtained after correlation of the local code on each frequency pathway (which depend on the carrier frequency) to one and the same phase scale representative of the delays and Doppler shifts of the multipaths.

The output signal of the compensation module C_D and the output signal of the first integrator INT1_1 of the main channel L1 are transmitted to a third multiplier M3 whose output signal is transmitted to a third integrator INT3, integrating over a duration of the order of from 1 second (mobile receivers) to 20 seconds (fixed receivers). Thus, the correlated common errors, for example identical propagation defects such as multipaths, which appear are isolated from noise.

The third multiplier M3 and the third integrator INT3 form an intercorrelation module or interspectral correlation module MI for the signals of the main and secondary channels L1, L2 correlated by the local code, after compensation of the relative frequencies of the said signals.

In fact, the operations of Doppler shift compensation and correlation of the two frequency pathways are performed, according to the proposed embodiment, by passage to the spectral domain by Fourier transformation or FFT, thereby making it possible to compensate for the frequency scales by simple spectral interpolation and to perform the correlation, by multiplication in the spectral domain and inverse Fourier transform or $FFT^{-1}$ back to temporal.

Figure 2:
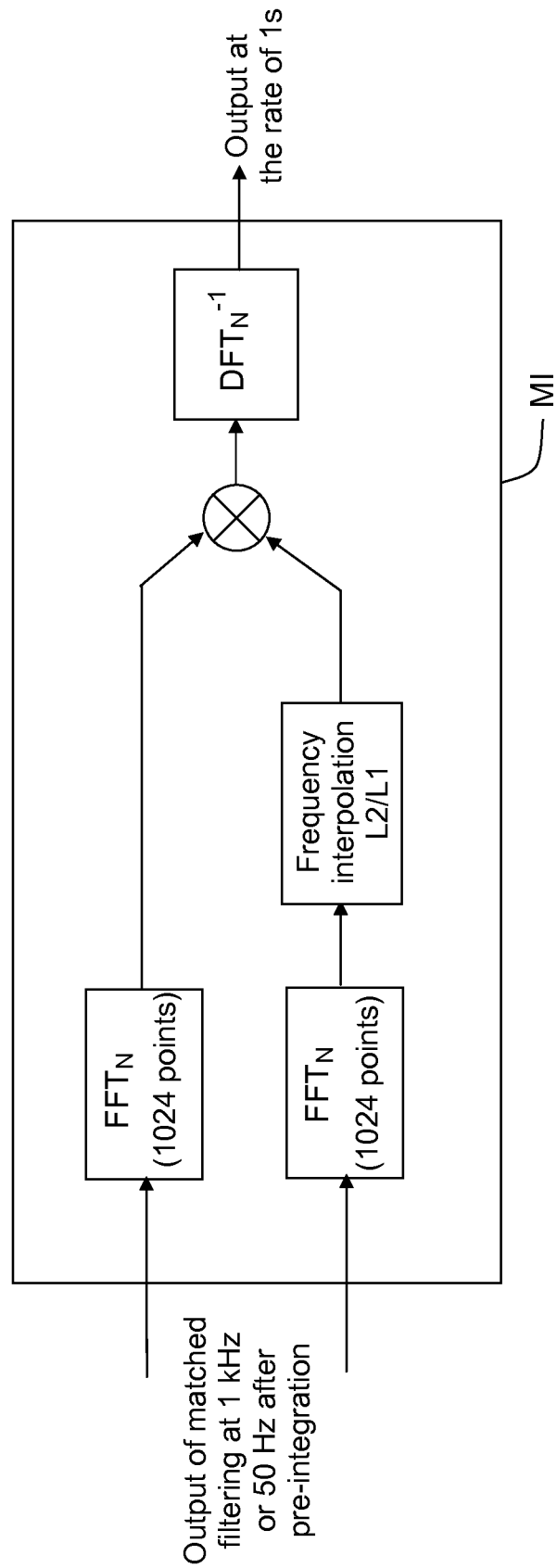
FIG. 2 illustrates an embodiment of the interspectral correlation module comprising the third multiplier M3 and the third integrator INT3.

As illustrated in FIG. 2, the complex FFT Fourier transformations are applied to each of the input signals sampled either at 1 kHz (directly arising from the correlation with the local code of length 1 ms) adapted to the case of a mobile receiver, or at 50 Hz (after pre-integration of a duration of 20 ms of the correlation outputs with the local code) adapted to the case of a fixed receiver.

An amplitude interpolation of the spectrum is carried out along the frequency axis on the spectrum obtained so as to reduce the frequency samples to identical samples of Doppler speed (thus making it possible to match up at one and the same Doppler speed the samples $k_i$ of the scale of the spectrum of the secondary channel L2 with the values interpolated at the values $k_i.F1/F2$. of the scale of the spectrum of the main channel L1).

The complex values of the two spectra can then be multiplied after complex conjugation of the spectrum of the channel L2 and the output of the correlation with zero delay is obtained by inverse discrete Fourier transform or $DFT^{-1}$ of the resulting spectrum on the frequency domain.

FIG. 2 schematically illustrates an embodiment of the interspectral correlation module MI. It specifies the manner of carrying out the correlation between the outputs at 1 kHz or at 50 Hz of the two correlation operations by the local codes (matched filtering by the local codes).

The interspectral correlation is carried out by passage to the spectral domain by FFT Fourier transformation on a length of N points, i.e. about 10 to 20 s in the case of a fixed receiver or 1 s in the case of a mobile receiver.

In the case of GPS signals, it is important that the signal slice obtained at the output of the integrator of the matched filtering, retained on the FFT Fourier transformation, be synchronized with the data (typically, at the rate of 20 ms in the GPS case corresponding to the duration of a data bit), that the data be previously demodulated and that the two FFT Fourier transformations be themselves carried out in a synchronous manner on the two frequency pathways.

The synchronization of the FFT Fourier transformation slices is determined in the data synchronization phase during the acquisition phase.

On the other hand, in the case of the signals of future systems, which comprise a pilot pathway (without data), it is no longer necessary to carry out such a demodulation of the data bits, it being possible for the tap-off rate at the output of the matched filtering and the number of FFT points to be arbitrary.

The interpolation consists in realigning the Doppler shift resulting from the FFT Fourier transformations of the two frequency pathways so as to compensate for the discrepancy due to the differences in carrier frequencies, in such a way that one and the same reflected path arriving with the same delay and the same relative speed with respect to the direct signal can be summed coherently in the frequency domain.

Once the interpolation has been carried out, the operations of (complex) product between the complex spectrum of the pathway L1 and the complex conjugate spectrum of the pathway L2 and of summation (in the frequency domain) of the samples make it possible to carry out the equivalent of a temporal correlation (for the value with zero delay).

The adjustment in the spectral domain of the Doppler scales thus makes it possible to enhance all the phase distortions linked to the signal propagation (assumed to be common on the two frequency channels), and to reduce solely the noise contributions (incoherent between frequency).

The resulting phase error is then representative solely of the signal propagation defects, with a view to the best matching of the local code to these defects of the received signal.

The signals estimating the errors of carrier phases $\phi_1$, $\phi_2$ output by the arctangent discriminators ARTG_1, ARTG_2, of the main L1 and secondary L2 channels, are also respectively transmitted to correction signal generators GEN_CORR_1 and GEN_CORR_2. The generators GEN_CORR_1 and GEN_CORR_2 allow the generation, for each frequency pathway, of a complex signal of correction of the evolution of the carrier phase representing solely the contribution of the dynamics of the carrier (estimated after integration over 20 ms of the phase). This signal is applied, at the rate of 50 Hz, in phase opposition (complex conjugate signal) so as to eliminate the contribution of the dynamics of the carrier to the instantaneous phase error in order to preserve only the errors linked to multipaths. The resulting signal calculated at the rate of 50 Hz then depends solely on the contributions to the output error of the arrival signal propagation disturbances.

The output signal of the third integrator INT3 is transmitted at the rate of a second to two fourth multipliers M4_1 and M4_2. The fourth multiplier M4_1 also receives, at the rate of 50 Hz, the generator GEN_CORR_1 output correction signal, and the fourth multiplier M4_2 also receives the generator GEN_CORR_2 output correction signal.

The output signal of the fourth multiplier M4_1 is transmitted, at the rate of 50 Hz, by a feedback loop B1, to a fifth multiplier M5_1 disposed between the output of the numerically-controlled oscillator NCO_C_1 and the second multiplier M2_1. The fifth multiplier M5_1 therefore receives as input the output signal of the fourth multiplier M4_1 and the output signal of the numerically-controlled oscillator NCO_C_1, and transmits their product as output to the second multiplier M2_1.

The output signals of the fourth multipliers M4_1 and M4_2 thus obtained then represent the phase errors, which are observed in a band of 50 Hz in the case of a fixed receiver, or of 1000 Hz in the case of a mobile receiver, and which are related solely to the propagation disturbances (no compensation of the useful signal's carrier phase, compensated moreover by the "conventional" phase loop, via the output signals of the arctangent discriminators ARTG_1 and ARTG_2.

The output signal of the fourth multiplier M4_2 is transmitted by a feedback loop B2, to a fifth multiplier M5_2 disposed between the output of the numerically-controlled oscillator NCO_C_2 and the second multiplier M2_2. The fifth multiplier M5_2 therefore receives as input the output signal of the fourth multiplier M4_2 and the output signal of the numerically-controlled oscillator NCO_C_2, and transmits their product as output to the second multiplier M2_2.

The output signals of the fourth multipliers M4_1 and M4_2 thereafter make it possible to compensate for the local code signals of the disturbance errors by simple complex multiplication (after complex conjugation of the compensation signal) by the fifth multipliers M5_1, M5_2.

The present invention makes it possible to improve at one and the same time the measurements of pseudo-distances and of phases, as well as to help to increase the integrity of the phase measurements thus obtained.

The invention claimed is:

1. Dual-frequency receiver for satellite-based positioning, the receiver comprising:
    a main channel and a secondary channel for a calculation of a correction of ionospheric propagation robust to differential phase errors linked to a local reception environment of signals, the main and secondary channels being configured to receive and conduct signals, each channel comprising a code phase generator, a carrier phase generator, integrators, phase and code discriminators, a code phase numerically-controlled oscillator, a carrier phase numerically-controlled oscillator, carrier phase loop matched filtering means, and code phase loop matched filtering means;
    means for determining code and carrier phase errors in the main and secondary channels comprising an interspectral correlation subassembly configured to convert the signals of the main and secondary channels, already correlated by a local code, to first and second frequency domain spectra, respectively, the interspectral correlation subassembly being further configured to perform a frequency shift compensation operation on at least one of the first and second frequency domain spectra, multiply the first spectrum with the second spectrum after the frequency shift compensation operation has been performed to obtain a result, and convert the result to a time domain signal; and
    respective feedback loops for the code and carrier phase errors in the main and secondary channels.

2. Receiver according to claim 1, wherein the means for determining comprises means for modifying the time domain signal by the respective carrier phase errors of the signals, specific to the local reception environment and the propagation of the signal, so as to transmit resulting signals in the feedback loops.

3. Receiver according to claim 1, wherein the frequency shift compensation operation comprises performing Doppler-effect compensation.

4. Receiver according to claim 3, wherein the means for determining comprises means for modifying the time domain signal by the respective carrier phase errors of the signals, specific to the local reception environment and the propagation of the signal, so as to transmit resulting signals in the feedback loops.

5. Method of dual-frequency reception for satellite-based positioning, by a main channel and a secondary channel that corrects for ionospheric propagation, the method comprising:
    determining respective code and carrier phase errors in the main and secondary channels using an interspectral correlation operation that comprises converting of the signals of the main and secondary channels, already correlated by a local code, to first and second frequency domain spectra, respectively, performing a frequency shift compensation operation on at least one of the first and second frequency domain spectra, multiplying the first spectrum with the second spectrum after the frequency shift compensation operation has been performed to obtain a result, and converting the result to a time domain signal; and
    providing the code and carrier phase errors in the main and secondary channels to respective feedback loops.

6. Dual-frequency receiver for satellite-based positioning, the receiver comprising:
    a first channel configured to receive a first carrier signal as a first received signal;
    a second channel configured to receive a second carrier signal as a second received signal;
    first and second phase lock loops configured to determine carrier phase errors in the first and second channels, respectively;
    first and second delay lock loops configured to determine code errors in the first and second channels, respectively, the first phase lock loop and the first delay lock loop correlating the first received signal with a first local code to produce a first correlated signal, the second phase lock loop and the second delay lock loop correlating the second received signal with a second local code to produce a second correlated signal;
    an interspectral correlation subassembly configured to convert the first and second correlated signals to first and second frequency domain spectra, respectively, the interspectral correlation subassembly being further configured to perform a frequency shift compensation operation on at least one of the first and second frequency domain spectra, multiply the first spectrum with the second spectrum after the frequency shift compensation operation has been performed to obtain a result, and convert the result to a time domain signal; and
    first and second feedback loops configured to remove at least a portion of the time domain signal from the first and second correlated signals.

* * * * *